United States Patent
Ueyama et al.

(10) Patent No.: US 12,090,815 B2
(45) Date of Patent: Sep. 17, 2024

(54) VENTILATION STRUCTURE OF VEHICLE

(71) Applicant: HONDA MOTOR CO., LTD., Tokyo (JP)

(72) Inventors: Tasuku Ueyama, Tokyo (JP); Takeshi Sasaki, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 331 days.

(21) Appl. No.: 17/678,080

(22) Filed: Feb. 23, 2022

(65) Prior Publication Data
US 2022/0348058 A1     Nov. 3, 2022

(30) Foreign Application Priority Data

Apr. 28, 2021    (JP) ................. 2021-076519

(51) Int. Cl.
| | |
|---|---|
| *B60R 7/02* | (2006.01) |
| *B60H 1/24* | (2006.01) |
| *B60R 13/01* | (2006.01) |
| *B60H 1/00* | (2006.01) |

(52) U.S. Cl.
CPC ............. *B60H 1/244* (2013.01); *B60H 1/249* (2013.01); *B60R 7/02* (2013.01); *B60R 13/011* (2013.01); *B60H 2001/006* (2013.01); *B60R 2013/016* (2013.01)

(58) Field of Classification Search
CPC ... B60R 13/011; B60R 7/02; B60R 2013/016; B60H 1/244; B60H 1/248; B60H 1/249; B60H 1/26; B60H 2001/006
USPC ...................................... 296/39.1, 39.3, 208
See application file for complete search history.

(56) References Cited

U.S. PATENT DOCUMENTS

| | | |
|---|---|---|
| 2010/0059208 A1 | 3/2010 | Nakamura |
| 2018/0319253 A1 | 11/2018 | Martinez et al. |

FOREIGN PATENT DOCUMENTS

| | | |
|---|---|---|
| CN | 101670775 | 3/2010 |
| CN | 103863063 | 6/2014 |
| CN | 108790701 | 11/2018 |
| JP | 07-004116 | 1/1995 |
| JP | 2001-130447 | 5/2001 |
| JP | 2001-253229 | 9/2001 |
| JP | 2006-335087 | 12/2006 |
| JP | 2013-018380 | 1/2013 |

(Continued)

OTHER PUBLICATIONS

Japanese Office Action for Japanese Patent Application No. 2021-076519 mailed Feb. 7, 2023.

(Continued)

*Primary Examiner* — Dennis H Pedder
(74) *Attorney, Agent, or Firm* — Amin, Turocy & Watson, LLP

(57) ABSTRACT

A ventilation includes an inlet opening, an outlet opening, and a ventilation passage. The inlet opening is disposed in an interior space at a rear portion of a vehicle. The outlet opening exhausts air in the interior space that has passed through the inlet opening to the outside of the vehicle. The ventilation passage is formed by being surrounded by an interior member that faces the interior space and a vehicle body panel that covers the outside of the interior member, and allows communication between the inlet opening and the outlet opening. A shielding plate that extends to intersect a noise entry path from the outlet opening to the inlet opening is disposed in a middle of the ventilation passage.

4 Claims, 5 Drawing Sheets

(56) References Cited

FOREIGN PATENT DOCUMENTS

| | | |
|---|---|---|
| JP | 2015-016809 | 1/2015 |
| JP | 2018-083545 | 5/2018 |
| KR | 10-2001-0064112 | 7/2001 |

OTHER PUBLICATIONS

Chinese Office Action for Chinese Patent Application No. 202210157443.6 mailed Mar. 20, 2024.

VENTILATION STRUCTURE OF VEHICLE

CROSS-REFERENCE TO RELATED APPLICATION

Priority is claimed on Japanese Patent Application No. 2021-076519, filed on Apr. 28, 2021, the contents of which are incorporated herein by reference.

BACKGROUND

Field of the Invention

The present invention relates to a ventilation structure of a vehicle that discharges air in a passenger compartment to the outside of the vehicle when a door is closed or the like.

Background

When a vehicle door is closed, pressure in an interior space temporarily rises. For this reason, ventilation is provided in a vehicle in order to curtail increases in pressure in the interior space. In the ventilation, when the door closes, indoor air is discharged to the outside of the vehicle, not only when the pressure in the interior space rises, but also when the interior space is ventilated. In this type of ventilation, an inlet opening is usually provided in a luggage compartment space or the like at a rear portion of the vehicle. An outlet opening of the ventilation is disposed in a portion of a vehicle body panel that is difficult to see from the outside of the vehicle, and the inlet opening and the outlet opening communicate with each other via a ventilation passage.

Since the ventilation of the vehicle exhausts the air in the interior space to the outside of the vehicle by there being communication between the interior space and outside of the vehicle, noise outside the vehicle, such as traveling noise, easily enters the inside of the vehicle through the inlet opening. Therefore, as a countermeasure thereagainst, a ventilation in which a part of a wall of the ventilation passage is formed of a sound insulating material, and the noise outside the vehicle is absorbed by the sound insulating material of the ventilation passage has been devised (for example, refer to Japanese Unexamined Patent Application, First Publication No. 2001-253229).

SUMMARY

Since the ventilation structure of the vehicle described in Japanese Unexamined Patent Application, First Publication No. 2001-253229 absorbs the noise outside the vehicle by the sound insulating material provided on part of the wall of the ventilation passage, it is difficult to obtain a sufficient sound insulation effect for noise entering straight from the outlet opening toward the inlet opening.

An aspect of the present invention provides a ventilation structure of a vehicle capable of sufficiently curtailing entry of noise outside the vehicle into an interior space through an inlet opening and enhancing quietness in the passenger compartment.

A ventilation structure of a vehicle according to an aspect of the present invention includes: an inlet opening disposed in an interior space at a rear portion of the vehicle; an outlet opening configured to exhaust air in the interior space that has passed through the inlet opening to an outside of the vehicle; and a ventilation passage formed by being surrounded by an interior member that faces the interior space and a vehicle body panel that covers an outside of the interior member and configured to allow communication between the inlet opening and the outlet opening, wherein a shielding plate that extends to intersect a noise entry path from the outlet opening to the inlet opening is disposed in a middle of the ventilation passage.

With such a constitution, when the pressure in the interior space is higher than that outside the vehicle due to a closing operation of a door or the like, the air in the interior space is discharged from the inlet opening through the ventilation passage to the outside of the vehicle from the outlet opening. Further, noise such as road surface noise that has entered the ventilation passage through the outlet opening hits the shielding plate on the way to the inlet opening, and direct entry of the noise into the interior space from the inlet opening is suppressed.

The shielding plate may be integrally formed with a resin block that constitutes part of the interior member.

In this case, when the interior member is mounted on the vehicle body, the shielding plate integrated with the resin block of the interior member is mounted in the ventilation passage. Therefore, when this constitution is adopted, mounting workability of the shielding wall is improved. In addition, the number of parts mounted in the vehicle can be reduced, and production efficiency of the vehicle can be improved.

A seal member that is in close contact with the vehicle body panel inside the ventilation passage may be mounted on the shielding plate.

In this case, since the shielding wall is in close contact with the vehicle body panel via the seal member, it is possible to further enhance a noise shielding effect of the shielding plate. In addition, it is possible to curtail noise generated due to the shielding plate coming into direct contact with the vehicle body panel.

The resin block may be constituted of an article storage box that is accessible from the interior space.

In this case, since the shielding plate is integrally formed with the resin article storage box, while an article storage function of the interior space at the rear portion of the vehicle is enhanced, it is possible to improve quietness of the passenger compartment without an increase in the number of parts.

A flap that opens according to a difference in pressure between the ventilation passage and the outside of the vehicle may be provided in the outlet opening.

In this case, the outlet opening is closed by the flap while the pressure inside the ventilation passage is lower than the pressure outside the vehicle. Therefore, under a condition that the flap is not open, the entry of the noise outside the vehicle into the interior space through the inlet opening can be more reliably suppressed.

The outlet opening may communicate with the outside of the vehicle through an inner space of a rear bumper.

In this case, the rear bumper can suppress entry of noise, water droplets, dust, and the like from outside the vehicle into the outlet opening.

In the ventilation structure of the vehicle according to the aspect of the present invention, the shielding plate that extends to intersect a noise entry path from the outlet opening to the inlet opening is disposed in the middle of the ventilation passage.

Therefore, the entry of the noise outside the vehicle into the interior space through the inlet opening can be sufficiently suppressed, and quietness inside a passenger compartment can be improved.

DESCRIPTION OF EMBODIMENTS

Figure 1:
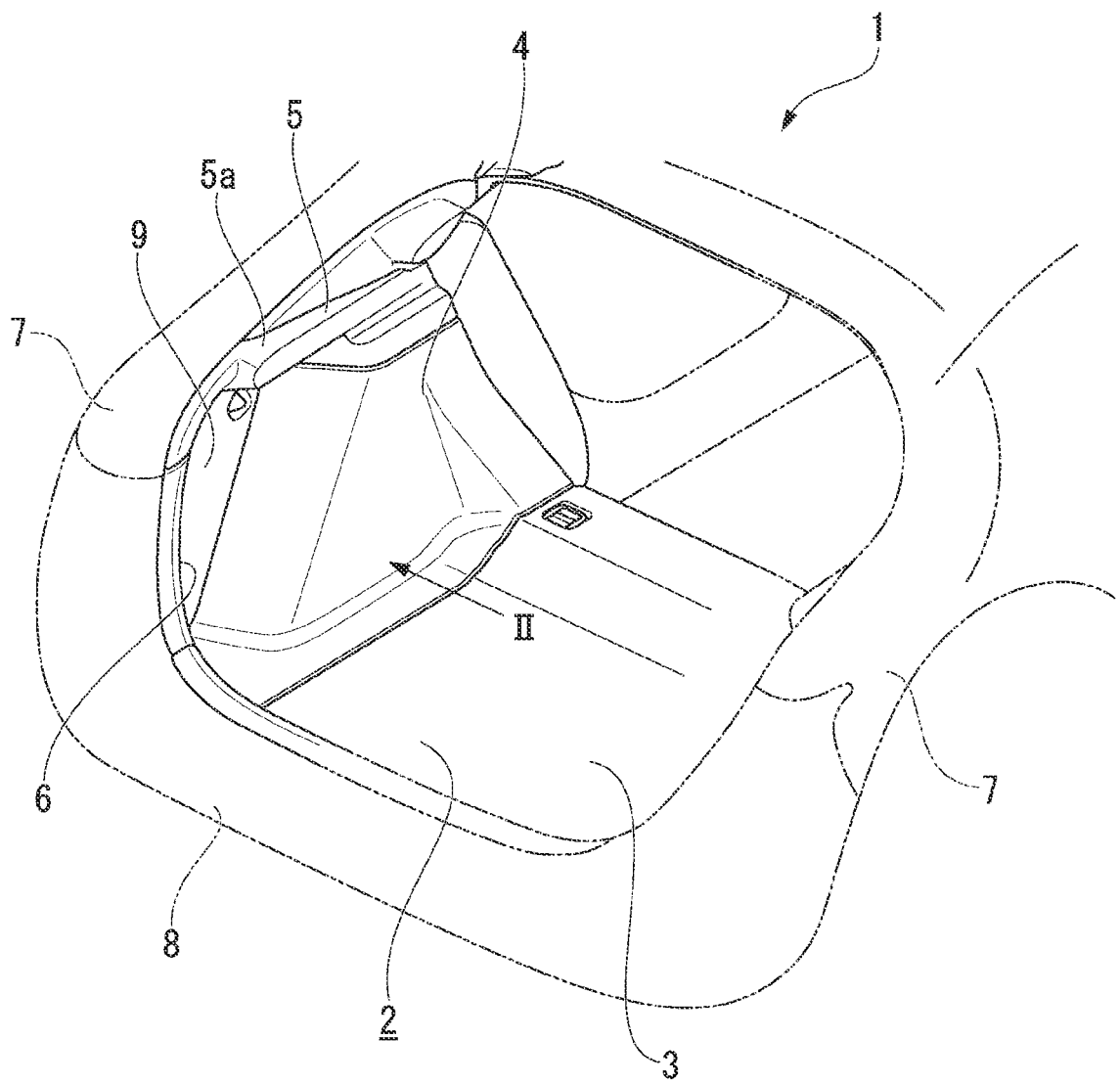
FIG. 1 is a perspective view of a rear portion of a vehicle according to an embodiment.
Figure 1:
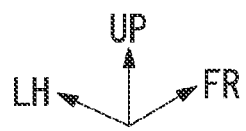

Hereinafter, an embodiment of the present invention will be described with reference to the drawings. In the following description, forward, rearward, upward, downward, leftward, and rightward refer to directions with respect to the forward direction of a vehicle 1 unless otherwise specified. Further, in appropriate places in the drawing, an arrow FR indicating a front of the vehicle 1, an arrow UP indicating the upper side of the vehicle 1, and an arrow LH indicating the left side of the vehicle 1 are marked.

FIG. 1 is a perspective view of a rear portion of the vehicle 1 according to the present embodiment.

In the vehicle 1 according to the present embodiment, a luggage compartment 2 (interior space) is disposed behind a rear seat (not shown). In the luggage compartment 2, side linings 4 made of a resin are mounted on both the left and right sides of a rear floor 3. The side linings 4 cover the inside of a passenger compartment in a wheel house (not shown) at the rear portion of the vehicle. Further, an inlet block 5 made of a resin is disposed on an upper portion of the side lining 4. The inlet block 5 is supported by a frame member at the rear portion of the vehicle (not shown).

A reference numeral 6 in FIG. 1 is a tailgate opening provided at the rear portion of the vehicle. A tailgate (not shown) is mounted in the tailgate opening 6 to be flipped up and thus opened and closed. Further, a reference numeral 7 in FIG. 1 denotes an outer panel made of metal and mounted on the outside of a side portion of the vehicle 1, and the reference numeral 8 is a rear bumper made of a resin and mounted on the rear portion of the vehicle body to be continuous with a rear end portion of the outer panel 7.

Figure 2:
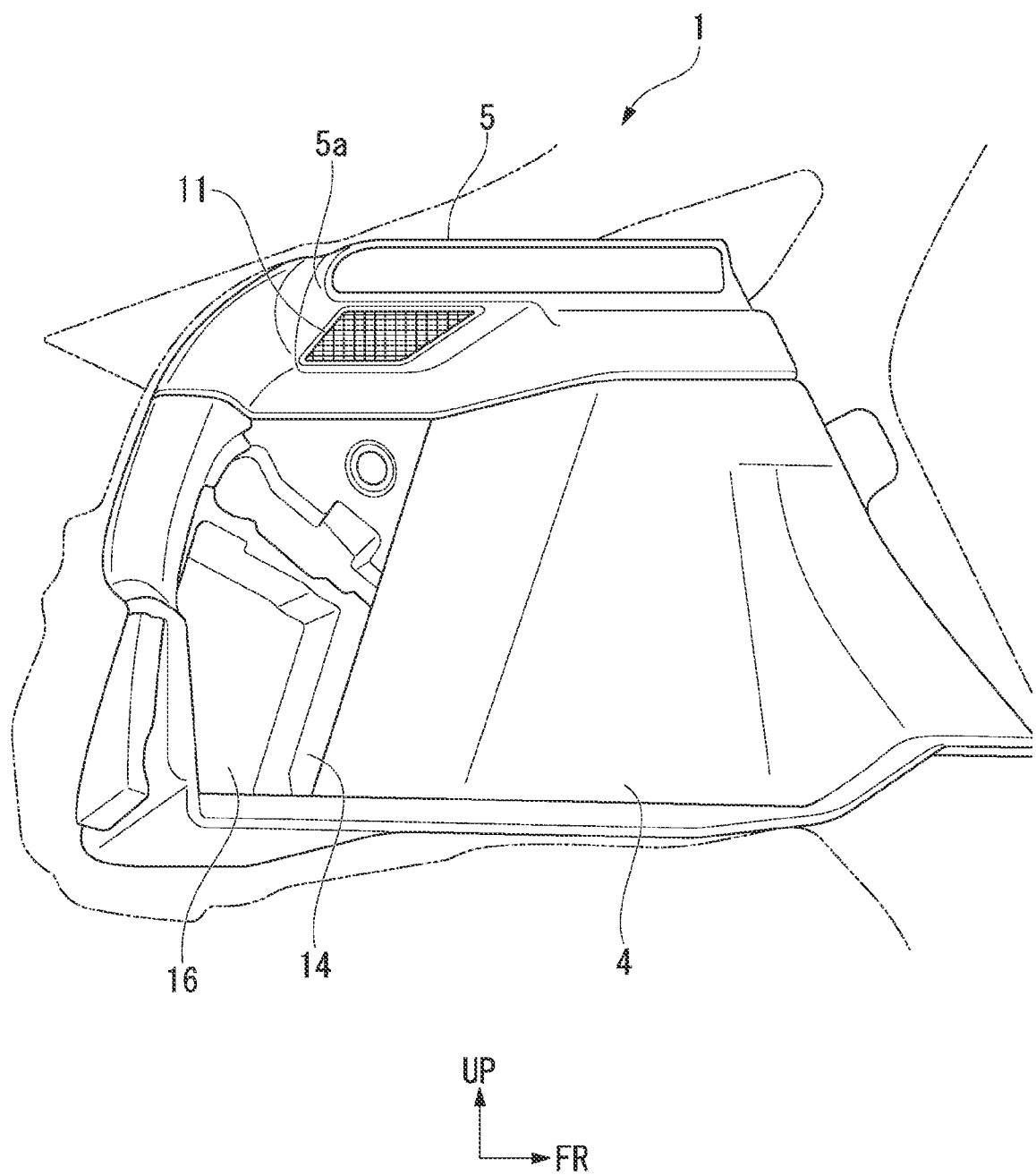
FIG. 2 is a view along an arrow II of FIG. 1.
Figure 3:
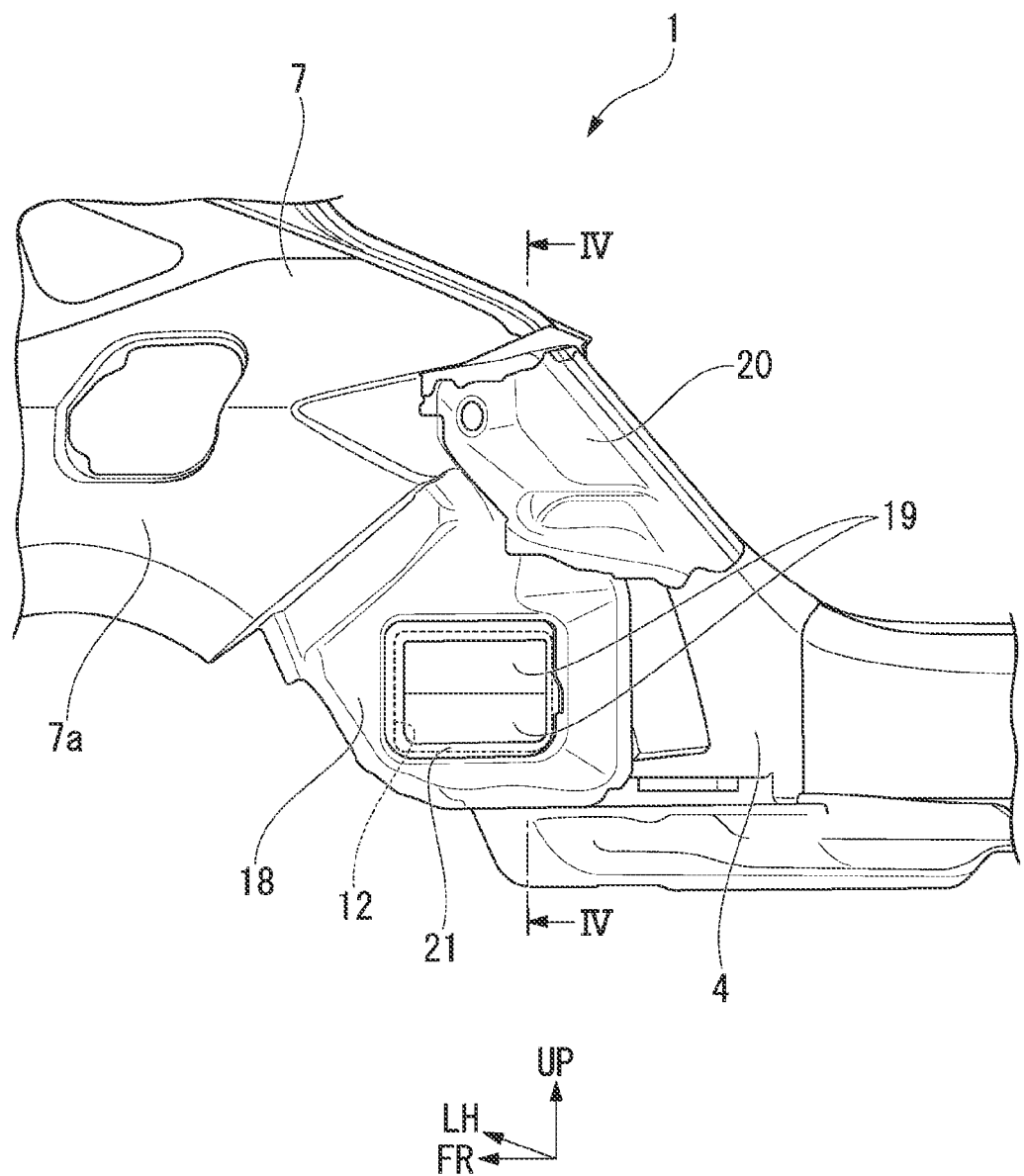
FIG. 3 is a perspective view of the rear portion of the vehicle according to the embodiment when seen from the outside of the vehicle.
Figure 4:
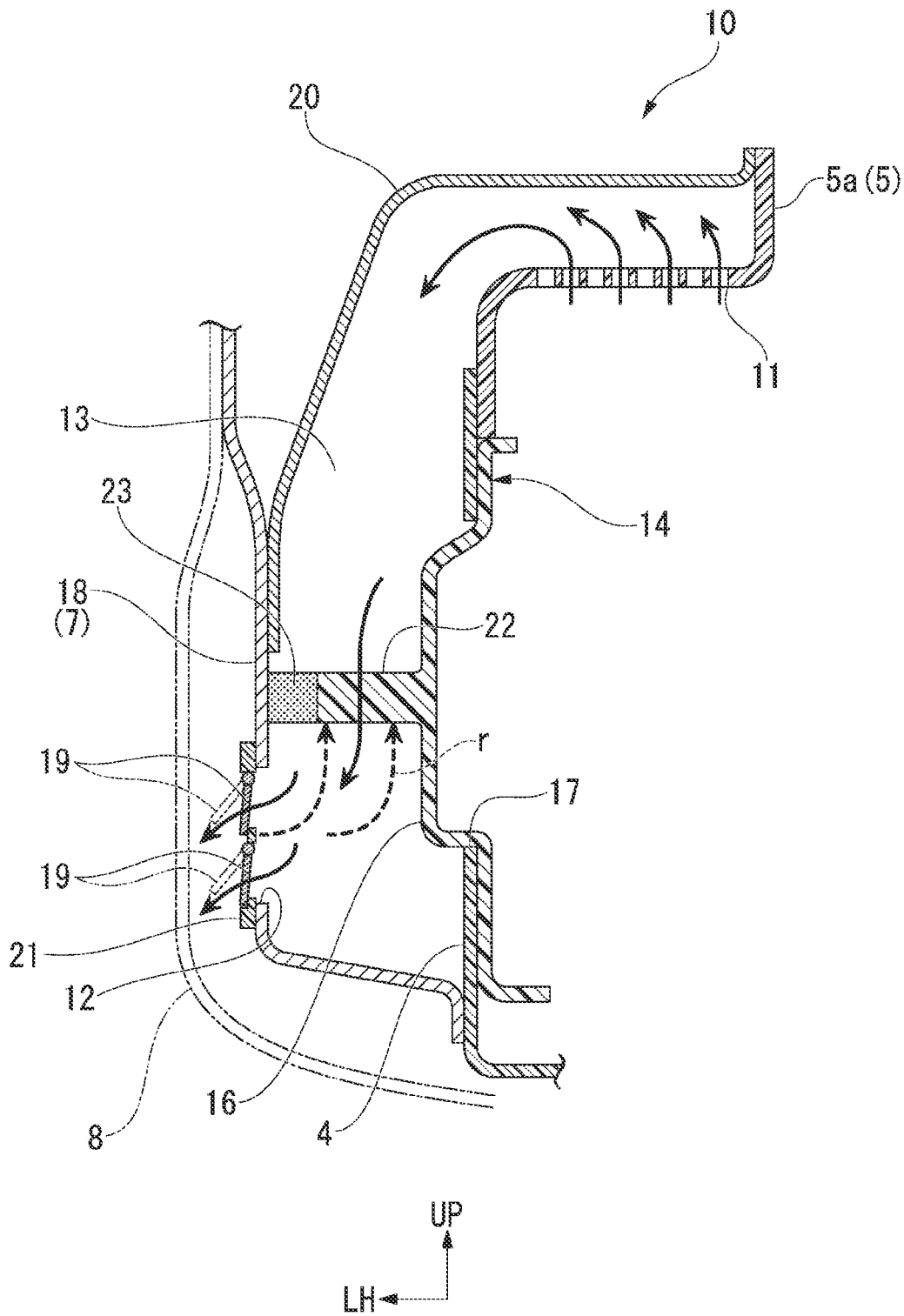
FIG. 4 is a cross-sectional view taken along line IV-IV of FIG. 3.

FIG. 2 is a view along an arrow II of FIG. 1. In FIG. 2, a lid member 9 that will be described below is removed. Further, FIG. 3 is a perspective view of a left rear portion of the vehicle 1 from which the rear bumper 8 is removed when seen diagonally from the left rear side. FIG. 4 is a cross-sectional view taken along line IV-IV of FIG. 3.

A ventilation 10 of the vehicle 1 includes an inlet opening 11 formed in the inlet block 5, an outlet opening 12 formed in a rear portion of the outer panel 7, and a ventilation passage 13 that allows communication between the inlet opening 11 and the outlet opening 12. Air in the luggage compartment 2 (an interior space) is discharged from the inlet opening 11 to the outlet opening 12 through the ventilation passage 13. The outlet opening 12 communicates with an inner space of the rear bumper 8. The air discharged to the outlet opening 12 is discharged to the outside of the vehicle through a mounting gap of the rear bumper 8.

As shown in FIGS. 2 and 4, an article storage box 14 made of a resin is mounted in a rear region of the side lining 4. The article storage box 14 is a concave resin block that opens toward the inside in a vehicle width direction (the luggage compartment 2 side), and a tool such as a jack can be stored in a concave portion thereof. The article storage box 14 is formed to be accessible from the luggage compartment 2 side (an article can be stored and taken out). An opening of the article storage box 14 is closed by the detachable lid member 9 (refer to FIG. 1).

The article storage box 14 is fixed to the side lining 4 as shown in FIG. 4. A bulging portion 16 having a substantially rectangular shape in a front view, which bulges outward in the vehicle width direction in a box shape is provided at a bottom portion (a bottom portion located outward in the vehicle width direction) of the article storage box 14. The bulging portion 16 is inserted into a substantially rectangular opening 17 of the side lining 4. The bulging portion 16 protrudes outward in the vehicle width direction of the side lining 4 through the opening 17.

Part of the inlet block 5 protrudes in a direction of the luggage compartment 2 on the upper side of the article storage box 14. The inlet opening 11 is formed in a lower surface of an overhanging portion 5a of the inlet block 5. For example, a louver, a mesh, or the like is provided in the inlet opening 11.

As shown in FIG. 3, an extension wall 18 that is recessed in a stepped shape inward in the vehicle width direction with respect to a design surface 7a on the outside of the vehicle extends at the rear end portion of the outer panel 7. The outlet opening 12 is formed in the extension wall 18. A plurality of (for example, two) flaps 19 are mounted on the outlet opening 12 of the extension wall 18 to be openable and closable. The flap 19 can open only in a direction toward the outside of the outlet opening 12 (the outside in the vehicle width direction). Therefore, the flap 19 opens the outlet opening 12 only when a pressure inside the luggage compartment 2 (inside the ventilation passage 13) is higher than a pressure outside the vehicle.

Further, as shown in FIGS. 3 and 4, a passage forming panel 20 made of a metal is joined to an upper portion of the extension wall 18 in the rear end portion of the outer panel 7. The passage forming panel 20 abuts the inlet block 5 on the outside of the vehicle and constitutes an upper half of the ventilation passage 13 together with the inlet block 5. Further, the extension wall 18 of the outer panel 7 abuts the side lining 4 on the outside of the vehicle and constitutes a lower half of the ventilation passage 13 together with the side lining 4 and the bulging portion 16 of the article storage box 14. As shown in FIG. 4, the ventilation passage 13 extends in a vertical direction of a vehicle body. Further, the outside of the extension wall 18 and the passage forming panel 20 is covered with a predetermined gap by a side portion of the rear bumper 8 when the rear bumper 8 is mounted on the vehicle body.

In the present embodiment, the passage forming panel 20 and the outer panel 7 (the extension wall 18) constitute a vehicle body panel, and the inlet block 5, the article storage box 14, the side lining 4, and the like constitute an interior member.

Figure 5:
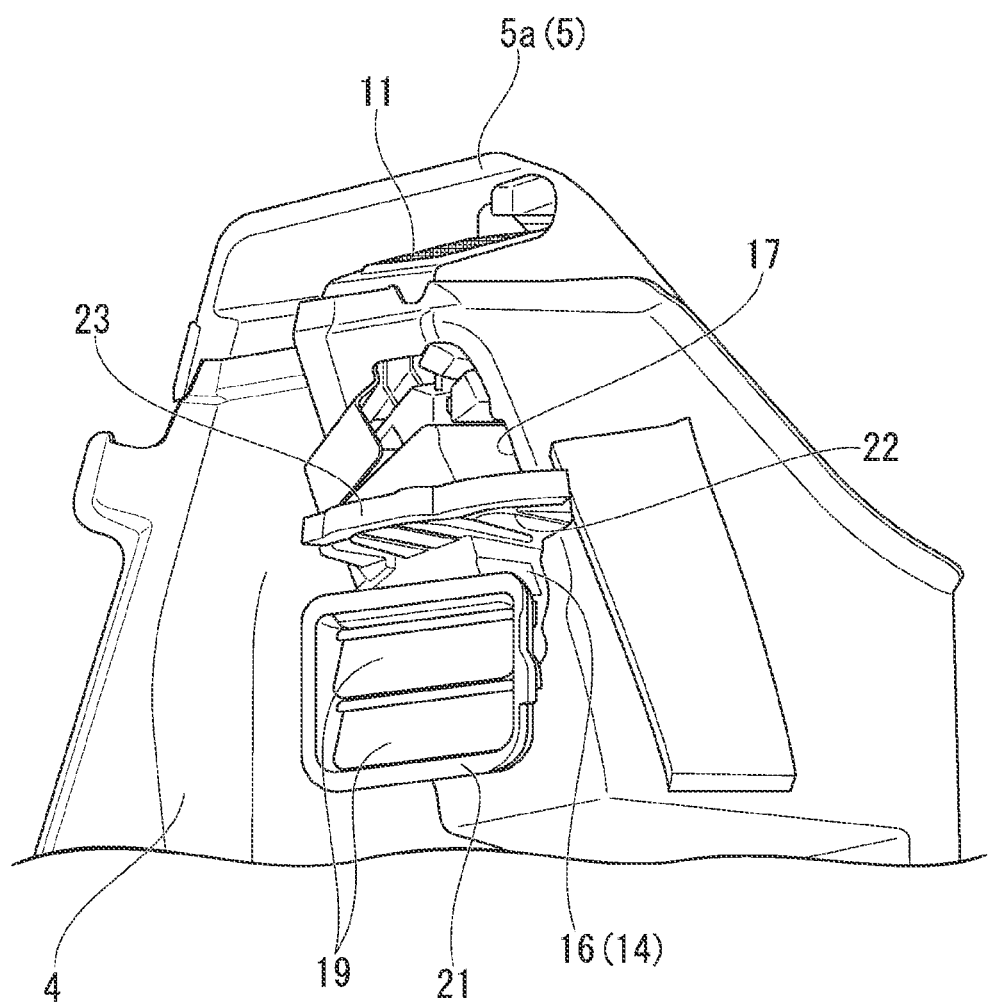
FIG. 5 is a perspective view of the rear portion of the vehicle according to the embodiment when seen from the outside of the vehicle in a state in which an outer panel and a passage forming panel have been removed.
Figure 5:
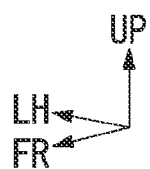

FIG. 5 is a perspective view of the rear portion of the vehicle 1 when seen from the outside of the vehicle in a state in which the outer panel 7 and the passage forming panel 20 are removed. In FIG. 5, the flap 19 mounted on the extension wall 18 of the outer panel 7 and a support frame 21 that supports the flap 19 are shown together.

As shown in FIGS. 4 and 5, the bulging portion 16 of the article storage box 14 is disposed to face the ventilation passage 13 through the opening 17 of the side lining 4. A shielding plate 22 having a predetermined thickness that extends to be orthogonal to a noise entry path r from the outlet opening 12 in the ventilation passage 13 toward the inlet opening 11 is integrally formed at the bottom portion of the bulging portion 16. A seal member 23 that is in close contact with an inner surface of the vehicle body panel (for example, the extension wall 18 of the outer panel 7) is mounted on the shielding plate 22. The seal member 23 has elasticity, and an elastic action thereof causes the seal member 23 to come into close contact with the inner surface of the vehicle body panel.

However, the shielding plate 22 and the seal member 23 do not completely block the ventilation passage 13. Sufficient gaps that allow a flow of air from the inlet opening 11 to the outlet opening 12 are secured before and after the shielding plate 22 and the seal member 23 in the ventilation passage 13.

In the above-described constitution, when the pressure inside the luggage compartment 2 becomes higher than that on the outside the vehicle due to a closing operation of the tailgate or the like, the air in the luggage compartment 2 passes through the ventilation passage 13 from the inlet opening 11, opens the flap 19 at the outlet opening 12 and is discharged to the outside of the vehicle through the mounting gap of the rear bumper 8.

On the other hand, when the flap 19 is open, noise such as road surface noise that has entered through the outlet opening 12 hits the shielding plate 22 on the way to the inlet opening 11 in the ventilation passage 13, and direct entry of the noise into the luggage compartment 2 from the inlet opening 11 is suppressed.

In the ventilation structure of the present embodiment, the shielding plate 22 that extends to intersect the noise entry path r from the outlet opening 12 to the inlet opening 11 is disposed in the middle of the ventilation passage 13. Therefore, the entry of the noise outside the vehicle that has entered the ventilation passage 13 through the outlet opening 12 into the luggage compartment 2 through the inlet opening 11 can be sufficiently suppressed. Therefore, when the ventilation structure of the present embodiment is adopted, the quietness in the passenger compartment can be greatly improved.

Further, in the ventilation structure of the present embodiment, the shielding plate 22 that shields the entry of noise is integrally formed on the resin block forming a part of the interior member. Therefore, when the interior member is mounted on the vehicle body, the shielding plate 22 integrated with the resin block of the interior member is mounted in the ventilation passage 13. Therefore, when the ventilation structure of the present embodiment is adopted, mounting workability of the shielding plate 22 is improved. Further, in this constitution, since the resin block of the interior member and the shielding plate 22 are integrated parts, the number of parts mounted in the vehicle can be reduced, and production efficiency of the vehicle can be improved.

Further, in the ventilation structure of the present embodiment, the seal member 23 in close contact with the vehicle body panel (for example, the extension wall 18 of the outer panel 7) inside the ventilation passage 13 is mounted on the shielding plate 22. Therefore, a noise shielding effect of the shielding plate 22 can be further enhanced. Further, in the case of this constitution, since direct contact of the shielding plate 22 with the vehicle body panel (for example, the extension wall of the outer panel 7) can be avoided, it is possible to suppress generation of vibration noise due to the shielding plate 22 coming into contact with the vehicle body panel.

Further, in the ventilation structure of the present embodiment, since the shielding plate 22 is integrally formed on the resin article storage box 14 in which the articles can be taken in and out of the luggage compartment 2 side, while an article storage function of the luggage compartment 2 at the rear portion of the vehicle is enhanced, it is possible to improve the quietness in the luggage compartment 2 without an increase in the number of parts.

Further, in the ventilation structure of the present embodiment, since the flap 19 that opens according to a difference in pressure between the ventilation passage 13 and the outside of the vehicle is provided in the outlet opening 12, the outlet opening 12 on the outside of the vehicle can be closed by the flap 19 while the pressure in the ventilation passage 13 is lower than the pressure on the outside of the vehicle. Therefore, under the condition that the flap 19 does not open, the entry of the noise outside the vehicle into the luggage compartment 2 through the inlet opening 11 can be more reliably suppressed.

Further, in the ventilation structure of the present embodiment, the outlet opening 12 communicates with the outside of the vehicle through the inner space of the rear bumper 8. Therefore, the rear bumper 8 can suppress entry of noise, water droplets, dust, and the like outside the vehicle into the outlet opening 12.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A ventilation structure of a vehicle, comprising:
    an inlet opening disposed in an interior space at a rear portion of the vehicle;
    an outlet opening configured to exhaust air in the interior space that has passed through the inlet opening to an outside of the vehicle; and
    a ventilation passage formed by being surrounded by an interior member that faces the interior space and a vehicle body panel that covers an outside of the interior member and configured to allow communication between the inlet opening and the outlet opening,
    wherein a shielding plate that extends to intersect the ventilation passage from the outlet opening to the inlet opening is disposed in a middle of the ventilation passage,
    the shielding plate is integrally formed with a resin block that constitutes part of the interior member,
    the resin block is constituted of an article storage box that is accessible from the interior space,
    the article storage box includes a bulging portion that bulges in a box shape toward an outside of the interior member,
    the bulging portion is inserted into an opening of the interior member, and
    the shielding plate is formed on a bottom section of the bulging portion.

2. The ventilation structure of the vehicle according to claim 1,
    wherein a seal member that is in close contact with the vehicle body panel inside the ventilation passage is mounted on the shielding plate.

3. The ventilation structure of the vehicle according to claim 1,
    wherein a flap that opens according to a difference in pressure between the ventilation passage and the outside of the vehicle is provided in the outlet opening.

4. The ventilation structure of the vehicle according to claim 3,
wherein the outlet opening communicates with the outside of the vehicle through an inner space of a rear bumper.

* * * * *